United States Patent
Ekladyous et al.

(10) Patent No.: US 7,850,349 B2
(45) Date of Patent: Dec. 14, 2010

(54) HEADLINER MOUNTED CENTER HIGH MOUNT STOP LAMP (CHMSL)

(75) Inventors: Albert Ekladyous, Shelby Township, MI (US); Tom Partch, Trenton, MI (US); Todd Schwanger, Farmington Hills, MI (US); Bruce Williams, Grosse Pointe Park, MI (US); Ehab Kaoud, Canton, MI (US); Jim Smithbauer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/620,164

(22) Filed: Jan. 5, 2007

(65) Prior Publication Data

US 2008/0164992 A1   Jul. 10, 2008

(51) Int. Cl.
*B60Q 1/00* (2006.01)
(52) U.S. Cl. .................. 362/490; 362/459; 362/493; 362/545; 362/479; 362/487; 362/488; 362/546; 362/549; 340/479
(58) Field of Classification Search .................. 362/509, 362/490, 800, 459, 479, 487, 488, 493, 545, 362/546, 549; 340/479
See application file for complete search history.

(56) References Cited

U.S. PATENT DOCUMENTS

| | | | |
|---|---|---|---|
| 5,091,831 A | 2/1992 | Van Order et al. | |
| 5,309,634 A * | 5/1994 | Van Order et al. | 29/863 |
| 5,347,435 A * | 9/1994 | Smith et al. | 362/503 |
| 5,398,387 A * | 3/1995 | Torigoe et al. | 24/452 |
| 5,484,186 A | 1/1996 | Van Order et al. | |
| 5,688,022 A | 11/1997 | Adams et al. | |
| 6,015,223 A * | 1/2000 | Kidd et al. | 362/503 |
| 6,273,499 B1 | 8/2001 | Guyon | |
| 2002/0130773 A1 * | 9/2002 | Santa Cruz et al. | 340/479 |
| 2003/0011214 A1 | 1/2003 | Gupte et al. | |
| 2005/0146887 A1 * | 7/2005 | Calderas | 362/509 |
| 2005/0151396 A1 | 7/2005 | Berberich et al. | |
| 2006/0290169 A1 * | 12/2006 | Fukushima et al. | 296/180.1 |

* cited by examiner

*Primary Examiner*—Sandra L O'Shea
*Assistant Examiner*—Jessica L McMillan
(74) *Attorney, Agent, or Firm*—Gregory Brown; Price, Heneveld, Cooper, DeWitt & Litton, LLP

(57) ABSTRACT

A vehicle headliner mounted center high mount stop lamp (CHMSL) including a light source disposable between a vehicle roof base layer and headliner generally aft of a vehicle, and a CHMSL frame disposable between the vehicle roof base layer and the headliner adjacent the light source. The CHMSL frame may be releasably mountable to the vehicle roof base layer by a fastener for mounting the headliner to the vehicle roof base layer. The invention also provides a method of mounting and servicing a CHMSL, including the steps of attaching the CHMSL to a vehicle roof base layer and/or a headliner, such that the CHMSL is disposed between the vehicle roof base layer and the headliner generally aft of the vehicle.

20 Claims, 5 Drawing Sheets

HEADLINER MOUNTED CENTER HIGH MOUNT STOP LAMP (CHMSL)

RELATED APPLICATIONS

This application claims benefit of priority of Chinese Application Serial No. 200610160956.3, filed Dec. 6, 2006, hereby incorporated by reference in its entirety.

BACKGROUND OF INVENTION a. Field of Invention

The invention relates generally to vehicle lighting systems, and, more particularly, to a vehicle headliner mounted center high mount stop lamp (CHMSL) with improved manufacturing, assembly and operational characteristics.

b. Description of Related Art

Vehicle headliner mounted center high mount stop lamps (CHMSLs) are well known in the art and are typically used in a variety of vehicles for providing a secondary means of warning or signaling when a vehicle's brakes are applied. Typically a CHMSL is mounted at or behind the vehicle rear window. For example, referring to FIG. 1A, conventional "end item" CHMSL designs, such as CHMSL 10, include a CHMSL which is manufactured separately as a unit and thereafter installed generally high and aft in the vehicle. A headliner 12 is then disposed over the CHMSL in a separate assembly step. While such CHMSL designs are acceptable in vehicles such as sport-utility vehicles, vans and other large vehicles, in cars, especially in coupes, installation of an end item CHMSL is comparably difficult due to the ergonomic factors of such vehicles which require an assembly operator to gain access to the assembly location in an often cramped environment. This is because the center, aft roof area in an automobile is difficult to access and reach by an assembly or a service operator, especially in a fast-paced vehicle assembly operation.

In order to address such manufacturing concerns associated with end item CHMSL designs, a variety of "part-in-assembly" (PIA) CHMSL designs have been proposed. Referring to FIG. 1B, an exemplary PIA headliner mounted CHMSL 14 is illustrated. Such PIA CHMSL designs eliminate the need for an assembly operator to separately install the CHMSL. Thus, while such PIA CHMSLs solve a variety of ergonomic and manufacturing concerns, current designs for PIA headliner mounted CHMSLs are nevertheless expensive because they require additional components for mounting and servicing the CHMSLs in a vehicle. For example, current PIA headliner mounted CHMSL designs, such as CHMSL 14 of FIG. 1B, have an expensive Class "A" cover panel 16 that is usually color keyed with the vehicle interior. This color keyed featured adds additional cost and complexity to the CHMSL design. The CHMSL bulbs (not shown) can only be serviced by removing panel 16. Additionally, current PIA headliner mounted CHMSL designs, such as CHMSL 14, have an expensive mounting bracket 18 that his hidden from view and supports attachment of the CHMSL to the vehicle body sheet metal 20. Bracket 18 must also be rigid for providing adequate support and therefore adds additional cost to the overall PIA CHMSL component. Further, current PIA headliner mounted CHMSL designs, such as CHMSL 14, typically require a mold on rubber seal (not shown) for eliminating reflected light from the backlight when the brake pedal is depressed. This mold on seal adds further cost to the overall PIA CHMSL component and can further complicate production tooling. Yet further, current headliner mounted CHMSLs (PIA as well as end item) require additional assembly plant labor and effort, in that existing designs are sensitive to tolerances and build variation due to the requirement for multiple components which create fit and finish concerns. These factors therefore limit use of existing interior roof mounted CHMSLs for luxury and other high-end automobiles, with exterior roof mounted CHMSLs being used for less expensive automobile designs.

Accordingly, there remains a need for a vehicle headliner mounted CHMSL, which is economical to manufacture, install and service, as compared to existing end item or PIA CHMSL designs, and is further robust in design for long term use in a variety of vehicles, including, SUVs, sedans, coupes and sports cars. There also remains a need for a CHMSL design which reduces design and tooling costs, and which further meets automotive fit and tolerance requirements for such components.

SUMMARY OF INVENTION

The invention solves the problems and overcomes the drawbacks and deficiencies of prior art vehicle headliner mounted CHMSL designs by providing a novel CHMSL design which is simple and economical to manufacture and install into a vehicle while facilitating the vehicle assembly process.

Thus, an exemplary aspect of the present invention is to provide a vehicle headliner mounted CHMSL which is usable with a variety of vehicles, including, SUVs, sedans, coupes and sports cars.

Another aspect of the present invention is to provide a vehicle headliner mounted CHMSL design which does not require a separate seal for eliminating reflected light from the backlight when the brake pedal is depressed.

Yet another aspect of the present invention is to provide a vehicle headliner mounted CHMSL design which is ergonomically superior or comparative to existing end item or PIA CHMSL designs.

The invention achieves the aforementioned exemplary aspects by providing a vehicle headliner mounted CHMSL including at least one light source disposable between a vehicle roof base layer and headliner generally aft of a vehicle, and a CHMSL frame disposable between the vehicle roof base layer and the headliner adjacent the light source. The CHMSL frame may be releasably mountable to the vehicle roof base layer by at least one fastener for mounting the headliner to the vehicle roof base layer.

For the vehicle headliner mounted CHMSL described above, the light source may include at least one LED. The CHMSL frame may include a body and a lens attached to the body for allowing light emitted from the light source to emit through the lens. The CHMSL may be mountable to the headliner by Velcro and/or hot melt. The CHMSL frame may include at least one leg including a protrusion for insertion of the fastener for mounting the headliner to the vehicle roof base layer, and the CHMSL therebetween. The light source may be mounted to or formed with the CHMSL frame.

The invention also provides a vehicle including a headliner mounted CHMSL. The vehicle may include a vehicle roof base layer and a headliner, with the CHMSL being disposed between the vehicle roof base layer and headliner generally aft of the vehicle. The CHMSL may include at least one light source disposed between the vehicle roof base layer and headliner generally aft of the vehicle, and a CHMSL frame disposed between the vehicle roof base layer and headliner adjacent the light source. The CHMSL frame may be releasably mounted to the vehicle roof base layer by at least one fastener for mounting the headliner to the vehicle roof base layer.

For the vehicle described above, the light source may include at least one LED. The CHMSL frame may include a body and a lens attached to the body for allowing light emitted from the light source to emit through the lens. The CHMSL may be mountable to the headliner by Velcro and/or hot melt. The CHMSL frame may include at least one leg including a protrusion for insertion of the fastener for mounting the headliner to the vehicle roof base layer, and the CHMSL therebetween. The light source may be mounted to or formed with the CHMSL frame.

The invention also provides a method of mounting and servicing a vehicle headliner mounted CHMSL. The method may include the steps of attaching the CHMSL to a vehicle roof base layer and/or a headliner such that the CHMSL is disposed between the vehicle roof base layer and the headliner generally aft of the vehicle. The method may further include the steps of providing at least one light source disposed between the vehicle roof base layer and the headliner generally aft of the vehicle, and attaching the headliner to the vehicle roof base layer with the CHMSL disposed therebetween by at least one fastener for mounting the headliner to the vehicle roof base layer.

For the method described above, the method may further include the steps of providing a CHMSL frame disposed between the vehicle roof base layer and the headliner, and releasably mounting the CHMSL frame to the vehicle roof base layer and/or the headliner. The light source may include at least one LED. The CHMSL frame may include a body and a lens attached to the body for allowing light emitted from the light source to emit through the lens. The CHMSL may be mounted to the headliner by Velcro and/or hot melt. The CHMSL frame may include at least one leg including a protrusion for insertion of the fastener for mounting the headliner to the vehicle roof base layer, and the CHMSL therebetween. The method may further include the steps of servicing the CHMSL by partially pulling the headliner to expose the CHMSL, servicing the CHMSL, and thereafter pressing the headliner to its original position. Further, the light source may be mounted to or formed with the CHMSL frame.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE PREFERRED EMBODIMENTS

Figure 1A:
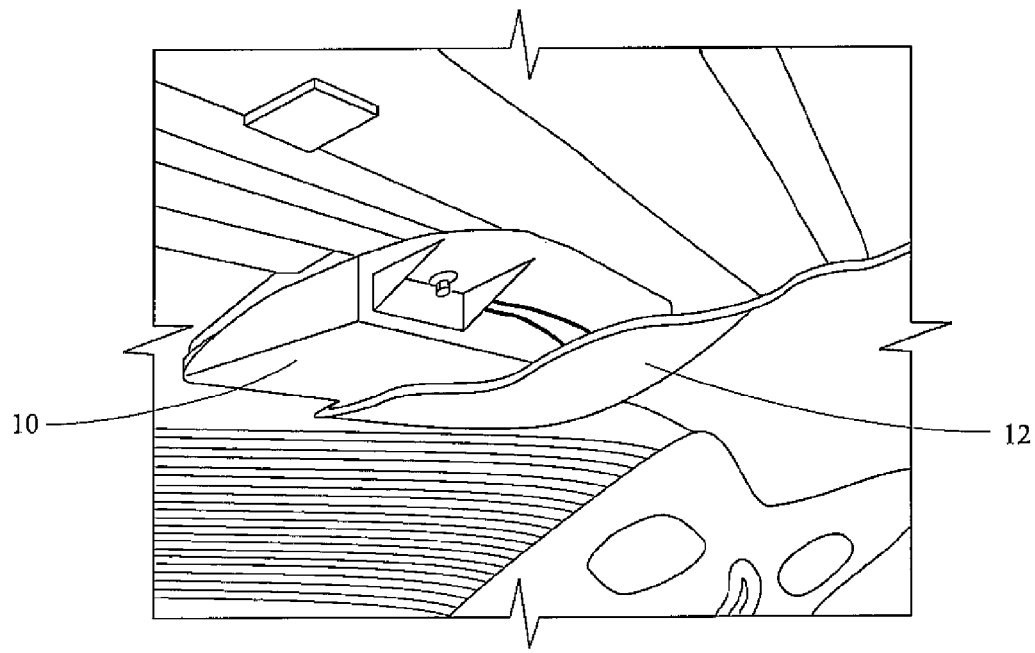
FIG. 1A is an isometric view of a related-art "end item" CHMSL design which is manufactured separately as a unit and thereafter installed generally high and aft in a vehicle.
Figure 1B:
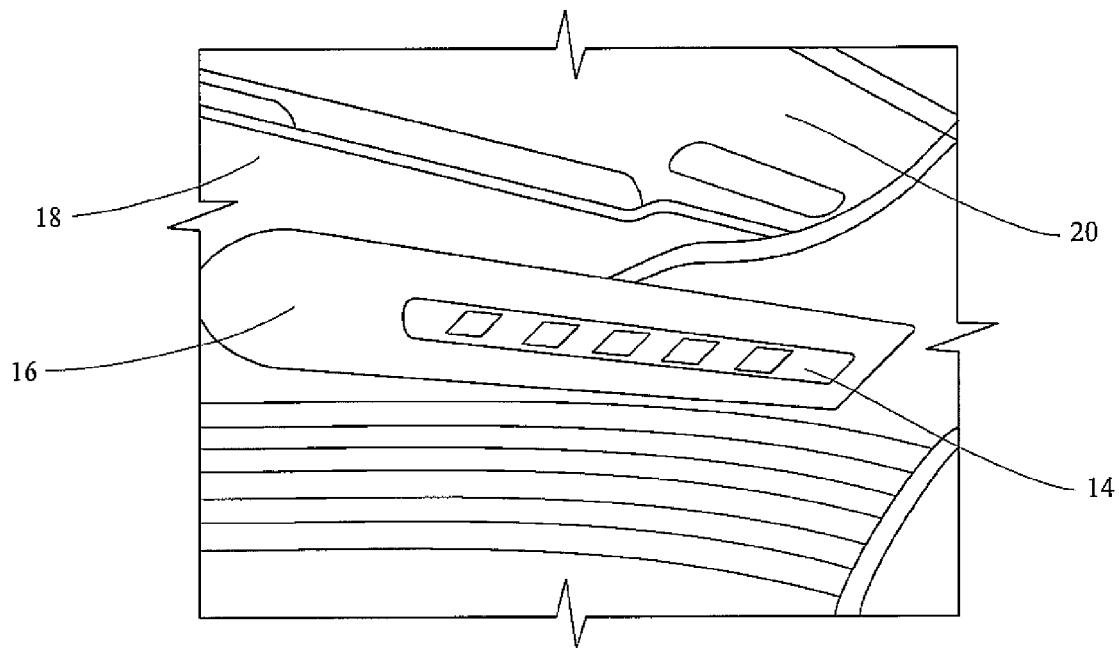
FIG. 1B is an isometric view of a related-art "part-in-assembly" (PIA) CHMSL design.

Referring now to the drawings wherein like reference numerals designate corresponding parts throughout the several views, FIGS. 2-5 illustrate a "part-in-assembly" (PIA) CHMSL design according to the present invention, generally designated "CHMSL 100," and various views which illustrate installation of CHMSL 100 in a vehicle.

Figure 2:
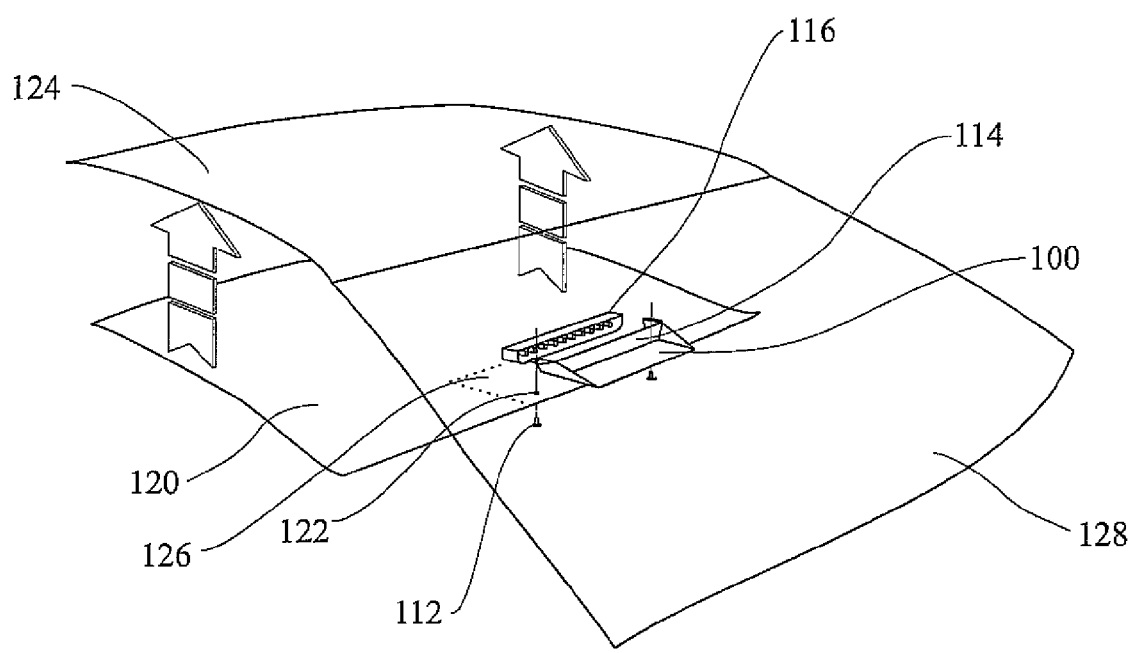
FIG. 2 is an isometric exploded view of a PIA CHMSL design according to the present invention, illustrating the CHMSL prior to being installed into a vehicle.
Figure 3:
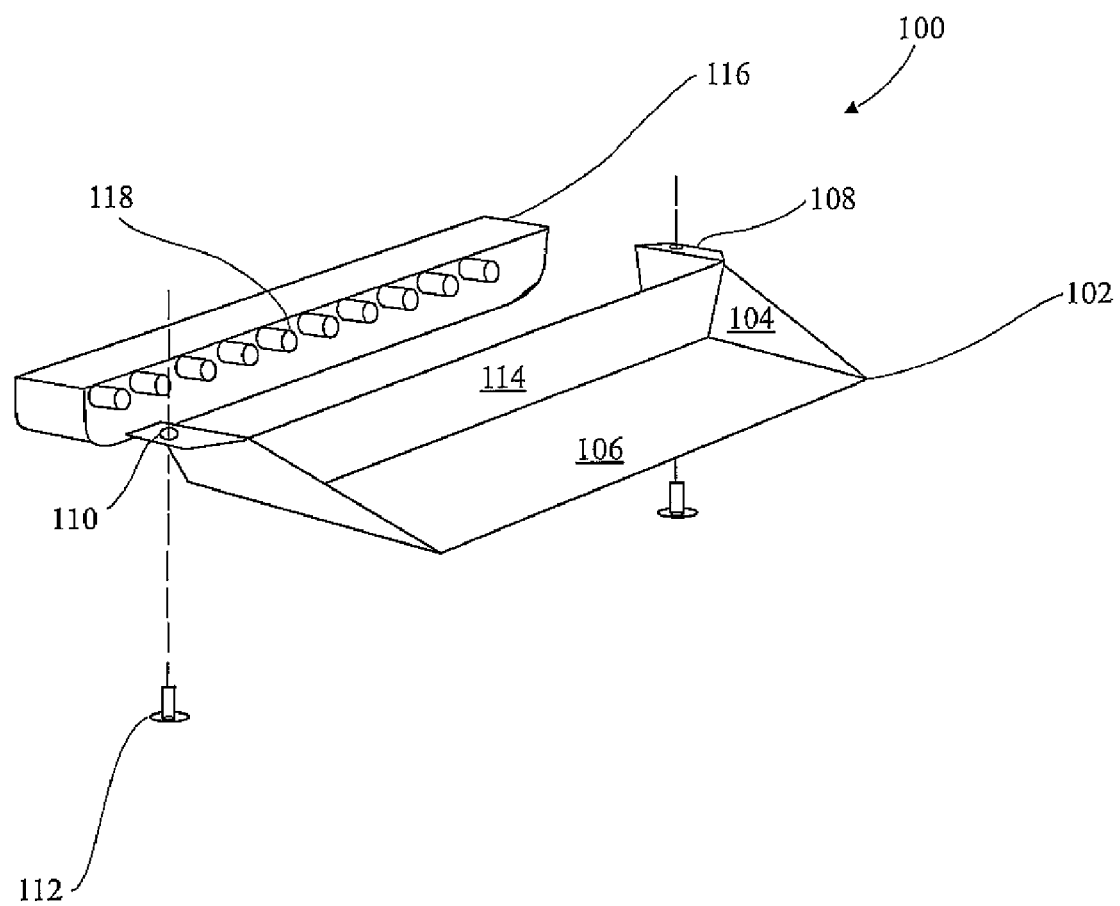
FIG. 3 is an isometric view of the CHMSL design of FIG. 2.
Figure 4A:
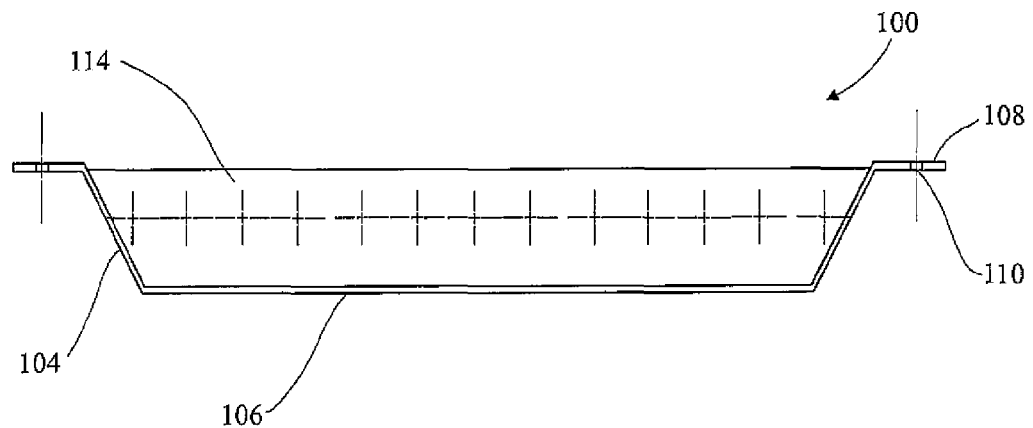
FIGS. 4A-4C are respectively front, top and side views of the CHMSL design of FIG. 2.
Figure 4B:
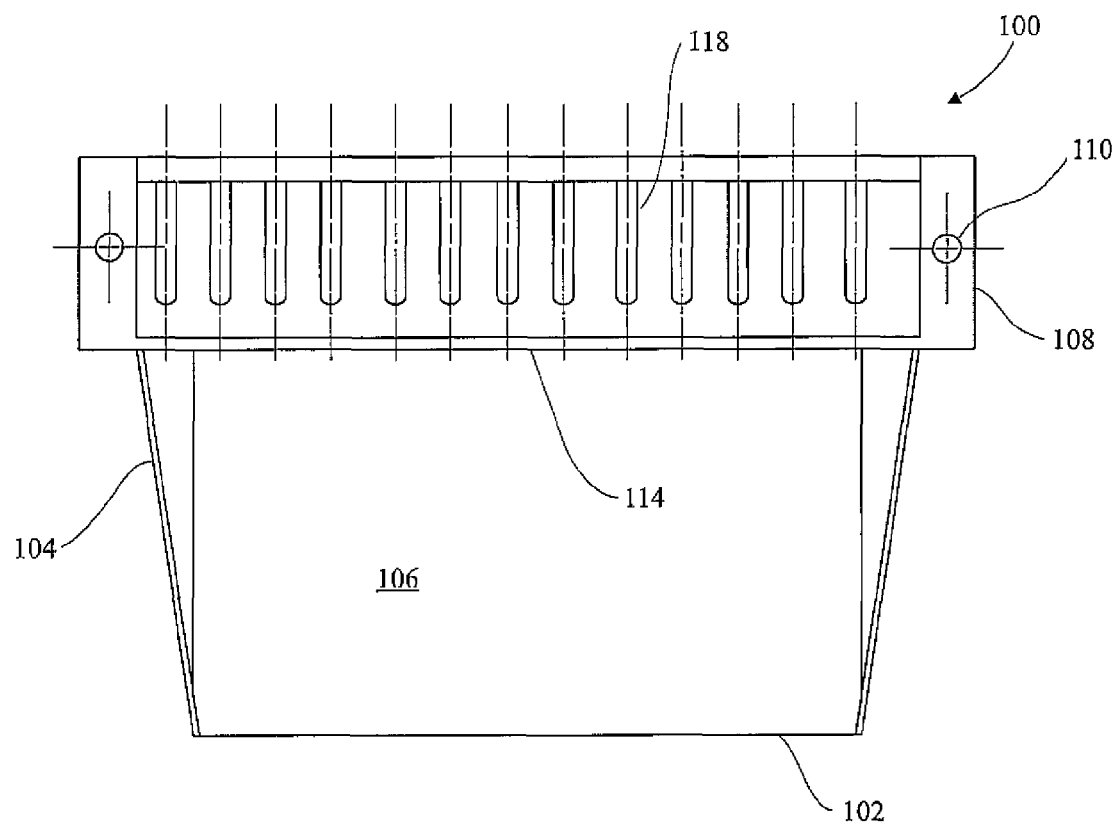
Figure 4C:
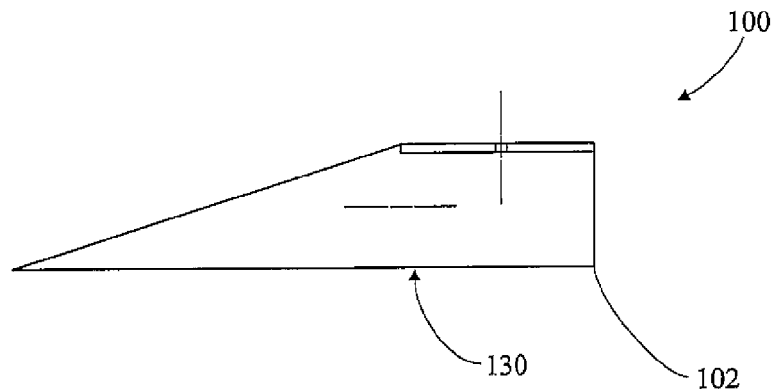

Referring to FIGS. 2-5, CHMSL 100 may generally include a frame 102 having mirror-image flanges 104 and a base 106. Flanges 104 may each include support portions 108, each including apertures 110 into which fasteners 112, such as push pins or other mounting means, may be inserted. A lens 114, which in the embodiment illustrated is transparent and includes a red color, may be adhesively or otherwise removably attached to the inner area of frame 102 by screws and other means known in the art. A light source 116, which in the embodiment of FIG. 2, is a LED unit including a plurality of LEDs 118, may be removably affixed to base 106 by screws, clips or other means known in the art. Light source 116 may include an electrical wire (not shown) extending therefrom towards an electrical control unit (not shown), with the wire being hidden by headliner 120 upon assembly of headliner 120 and CHMSL 100 onto vehicle roof 124, which in the embodiment illustrated is a metal base layer. In this manner, CHMSL 100 may be installed onto headliner 120 as a unit including base 106, lens 114 and light source 116, and the entire assembly may then be attached to roof 124 as discussed in detail below.

CHMSL 100 may be formed of a plastic, metallic or other materials known in the art, and may be shaped for a complementary fit adjacent rear window 128. Thus those skilled in the art would readily appreciate in view of this disclosure that the particular shape of CHMSL 100 as illustrated in FIGS. 2-5, is provided for illustrative purposes only, and may be readily modified depending on the complementary fit requirements with a vehicle roof, rear window and adjacent components.

In order to install CHMSL 100 to an automobile, CHMSL 100 may first be attached to headliner 120 by, for example, Velcro or hot melt. In this manner, for headliners supplied as a unit, CHMSL 100 may be provided pre-assembled with a headliner and the assembly may be mounted to a vehicle roof as discussed below. Upon attachment of CHMSL 100 to headliner 120, push pins 112 may be inserted through apertures 122 in headliner 120 and thereafter through respective apertures 110 of CHMSL 100, for retention of the push pins. In this manner, instead of using washers, which are conventionally provided for securing push pins 112 in place for subsequent assembly of headliner 120 to the vehicle roof 124 by insertion of the push pins in complementary slots (not shown) of the vehicle roof, CHMSL 100 essentially functions to retain push pins 112 to headliner 120. Thus CHMSL 100 provides for a reduction in the use of mounting brackets (as discussed above for conventional PIA CHMSL designs), as well as a reduction in use of washers and other such components which primarily add to the cost of the manufacturing process due to issues related to handling of such components.

Once CHMSL 100 is installed onto headliner 120, the PIA CHMSL/headliner assembly may then be installed as a single component to vehicle roof 124 by simply insertion of push pins 112 into complementary slots (not shown) on the underside of roof 124. Further the electrical connection of light source 116 may be appropriately connected to appropriate electrical wiring or circuitry (not shown), or alternatively, for a CHMSL including electrical wiring protruding therefrom, the electrical wiring may be appropriately connected to electrical circuitry provided for such a connection.

Figure 5:
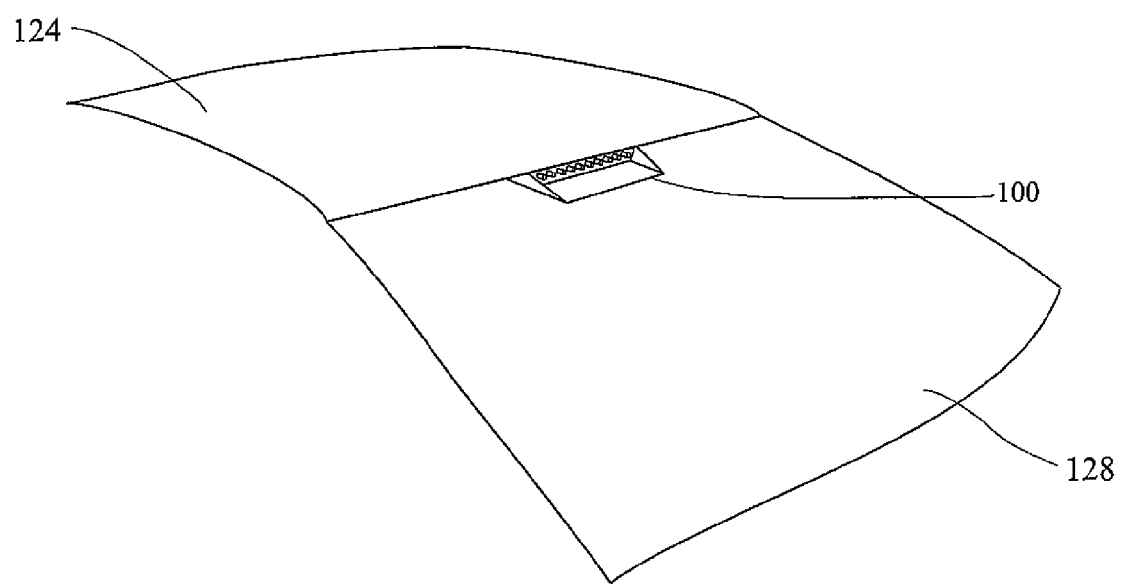
FIG. 5 is an isometric view of the CHMSL design of FIG. 2, illustrating the CHMSL in its attached position within a vehicle.

As illustrated in FIG. 5, CHMSL 100 may thus rest against the inner surface of rear window 128. Compared to conventional PIA as well as end item CHMSL designs, since the bottom surface 130 of CHMSL 100 is covered by area 126 of headliner 120, CHMSL 100 also does not require a separate seal for eliminating reflected light from the backlight when the brake pedal is depressed, or a separate cover panel as discussed above for PIA CHMSL assemblies.

In this manner, once installed, area 126 of headliner 120, which is formed of a soft and flexible nylon or other known material, may be bent under base 106 such that the finished assembly includes a smooth contoured surface under CHMSL 100.

In order to service CHMSL 100, a service operator may simply pull area 126 of headliner 120 away from roof 124 to expose CHMSL 100. Once exposed, CHMSL 100 and the aforementioned components thereof may be serviced and/or replaced as needed. Once serviced, the PIA CHMSL/headliner assembly may be re-assembled as a single component to vehicle roof 124 by simply re-insertion of push pins 112 into complementary slots (not shown) in roof 124 and electrical connection of light source 116 to appropriate electrical wiring (not shown). Alternatively, due to the cost-effective design of CHMSL 100, the entire body of CHMSL 100 including light source 116 may be replaced as needed.

To summarize, the present invention thus provides a CHMSL design which is simple and economical to manufacture and install into a vehicle to facilitate the vehicle assembly process. CHMSL 100 may be used with a variety of vehicles, including, SUVs, sedans, coupes and sports cars. For coupes and sports cars which include a narrow access area aft of the vehicle, CHMSL 100 particularly facilitates the assembly and service process, as discussed above, due to its ease of assembly and removal. Yet further, CHMSL 100 does not require a separate seal (but one may be provided if needed) for eliminating reflected light from the backlight when the brake pedal is depressed, eliminates a host of manufacturing and assembly tolerance requirements due to its complementary installation between headliner 120 and roof 124, eliminates typical fit and finish concerns with use of separate Class "A" covers (as discussed above for conventional PIA CHMSL assemblies), and provides styling flexibility by allowing interior mounted CHMSLs to be styled at the same low cost as exterior mounted CHMSLs that are usually mounted on a deck lid or lift gate.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A vehicle headliner mounted center high mount stop lamp (CHMSL) comprising:

a CHMSL frame disposed between a vehicle roof base layer and headliner and resting against a vehicle rear window;

a light source disposed in the frame; and a separate removable fastener extending through the headliner and releasably mounting the CHMSL frame and headliner to the vehicle roof, wherein the headliner extends completely under said CHMSL and provides a smooth contoured surface.

2. A vehicle headliner mounted CHMSL according to claim 1, wherein said light source includes at least one LED.

3. A vehicle headliner mounted CHMSL according to claim 1, wherein said CHMSL frame includes a body and a lens attached to said body for allowing light emitted from said light source to emit through said lens.

4. A vehicle headliner mounted CHMSL according to claim 1, wherein said CHMSL is mountable to the headliner by at least one of Velcro and hot melt.

5. A vehicle headliner mounted CHMSL according to claim 1, wherein said CHSML frame includes at least one leg including a protrusion for insertion of the fastener for mounting the headliner to the vehicle roof base layer, and said CHMSL therebetween.

6. A vehicle headliner mounted CHMSL according to claim 1, wherein said light source is mounted to or formed with said CHMSL frame.

7. A vehicle including a headliner mounted center high mount stop lamp (CHMSL), said vehicle comprising:

a CHMSL frame disposed between a vehicle roof base layer and said headliner generally aft of said vehicle;

a light source disposed in the frame;

first and second side supports disposed on the CHMSL frame and abutting the vehicle roof base layer; and a removable fastener extending through the headliner and first and second supports of the CHMSL frame.

8. A vehicle according to claim 7, wherein said light source includes at least one LED.

9. A vehicle according to claim 7, wherein said CHMSL frame includes a body and a lens attached to said body for allowing light emitted from said light source to emit through said lens.

10. A vehicle according to claim 7, wherein said CHMSL is mounted to said headliner by at least one of Velcro and hot melt.

11. A vehicle according to claim 7, wherein said CHMSL frame includes at least one leg including a protrusion for insertion of said fastener for mounting said headliner to said vehicle roof base layer, and said CHMSL therebetween.

12. A vehicle according to claim 7, wherein said light source is mounted to or formed with said CHMSL frame.

13. A method of mounting and servicing a vehicle headliner mounted center high mount stop lamp (CHMSL) in a vehicle, said method comprising the steps of:

attaching said CHMSL to at least one of a vehicle roof base layer and a headliner such that said CHMSL is disposed between said vehicle roof base layer and said headliner generally aft of said vehicle;

providing at least one light source disposed between said vehicle roof base layer and said headliner generally aft of said vehicle;

covering a base of said CHMSL with said headliner such that said CHMSL is substantially hidden from view inside the vehicle; and extending at least one removable fastener through said headliner and said CHMSL, such that said removable fastener is partially exposed below said headliner.

14. A method according to claim 13, further comprising the steps of:
- providing a CHMSL frame disposed between said vehicle roof base layer and said headliner; and
- releasably mounting said CHMSL frame to at least one of said vehicle roof base layer and said headliner.

15. A method according to claim 13, wherein said light source includes at least one LED.

16. A method according to claim 13, wherein said CHMSL frame includes a body and a lens attached to said body for allowing light emitted from said light source to emit through said lens.

17. A method according to claim 13, wherein said CHMSL is mounted to said headliner by at least one of Velcro and hot melt.

18. A method according to claim 13, where said CHMSL frame includes at least one leg including a protrusion for insertion of said fastener for mounting said headliner to said vehicle roof base layer, and said CHMSL therebetween.

19. A method according to claim 13, further comprising the step of servicing said CHMSL by:
- partially pulling said headliner to expose said CHMSL;
- servicing said CHMSL; and
- pressing said headliner to its original position.

20. A method according to claim 13, wherein said light source is mounted to or formed with said CHMSL frame.

* * * * *